April 21, 1970 — W. STRIEN ETAL — 3,507,000

HINGE FITTINGS FOR SEATS WITH ADJUSTABLE BACK RESTS

Filed Dec. 2, 1966

Inventors
Werner Strien
Karl Cless
By Ernest Montague
attorney

April 21, 1970 W. STRIEN ETAL 3,507,000
HINGE FITTINGS FOR SEATS WITH ADJUSTABLE BACK RESTS
Filed Dec. 2, 1966 2 Sheets-Sheet 2
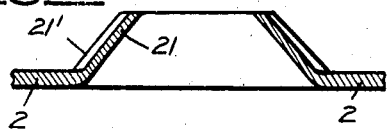
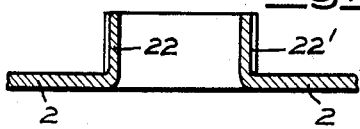
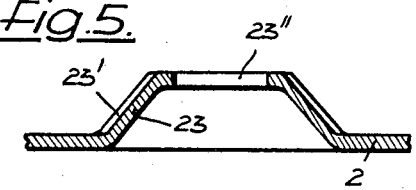
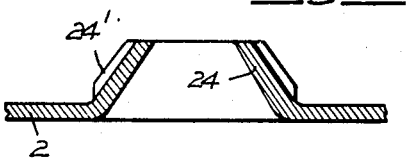
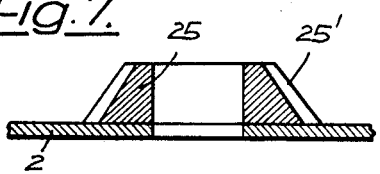
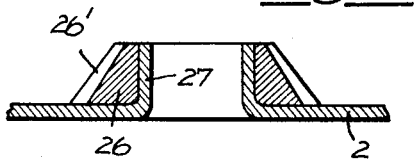
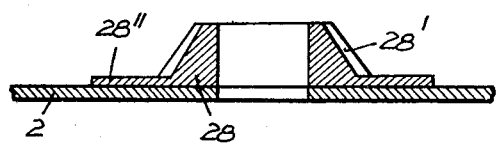
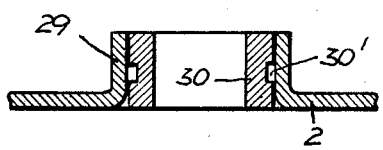
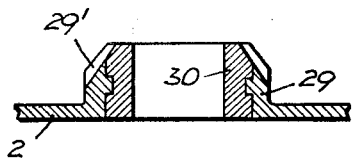
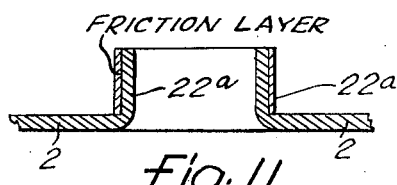

3,507,000
HINGE FITTINGS FOR SEATS WITH
ADJUSTABLE BACK RESTS
Werner Strien, Stuttgart-Heumaden, and Karl Cless,
Weilheim an der Teck, Germany, assignors to
Recaro AG., Glarus, Switzerland, a Swiss joint-
stock company
Filed Dec. 2, 1966, Ser. No. 598,859
Int. Cl. E05d 11/10
U.S. Cl. 16—146                                   5 Claims

ABSTRACT OF THE DISCLOSURE

A hinge fitting for a seat with an adjustable back rest, especially for a motor vehicle, which comprises a first hinge member adapted to be secured to the back rest, and a second hinge member adapted to be secured to the seat and pivotably connected to said first hinge member. A first locking member is rigid on the second hinge member and has an outer surface. A shaft is rotatably mounted in the first locking member, and a tubular second locking member is mounted on the shaft so as to be non-rotatable thereon but movable in the axial direction thereof. The second locking member has an inner surface adapted to engage with or to discharge from the outer surface of the first locking member when the second locking member is shifted in one direction or the other. Means are provided on the outer surface of the first locking member and/or the inner surface of the second locking member for preventing one locking member from rotating relative to the other locking member, when the two locking members are engaged with each other, means are arranged for securing the shaft against movement in its axial direction, and means are also arranged for shifting the second locking member in its axial direction from one position in engagement with the second locking member to another position in which it is disengaged from the second locking member, and vice versa, and the improvement consists of the fact that the first locking member comprises a collar formed on the second hinge member.

The present invention relates to a hinge fitting for a seat with an adjustable back rest, especially for a motor vehicle of the type as described in the U.S. Patent No. 3,156,004 to Strien et al., which comprises a first hinge member which is adapted to be secured to one side of the back rest, a second hinge member which is adapted to be secured to the same side of the seat and is pivotably connected to the first hinge member, a first locking member which is rigid on the second hinge member and has an outer surface, a shaft which is rotatably mounted in the first locking member, a tubular second locking member which is mounted on this shaft so as to be nonrotatable thereon but movable in the axial direction thereof thereon, and has an inner surface operatively associated with the outer surface of the first locking member and adapted when shifted in the axial direction to engage with or disengage from the outer surface of the first locking member, means provided on the outer surface of the first locking member and on the inner surface of the second locking member for preventing one locking member from rotating relative to the other locking member when said two locking members are engaged with each other, means for securing the shaft against movement in its axial direction, and means for shifting the second locking member in its axial direction from one position in which the first and second locking members are engaged to another position in which they are disengaged, and vice versa.

A hinge fitting of the type as above described has the disadvantage that not only the axially movable locking member but also the locking member which is secured in a fixed position is provided in the form of a milled or drop-forged gear wheel. The production of such gear wheels is very expensive and generally also requires a heat treatment of the gear teeth.

It is an object of the present invention to simplify the production and reduce the cost of hinge fittings of the above-mentioned type in which one hinge member is usually provided in the form of a casing of sheet steel. According to the invention, this object is attained by providing the hinge member which carries the fixed locking member with a collar which is designed so as to form this locking member.

For engaging the locking members, that is, the axially movable locking member and the fixed locking member, i.e. the collar, with each other so that the collar will lock the axially movable locking member so as to prevent it from turning relative to the collar, both parts may be provided with serrations or gear teeth or with friction coatings.

By providing the fixed locking member in the form of a collar on the associated hinge member the advantage is attained that the hinge members may be produced by cold-working and that, if the locking members are provided with serrations or gear teeth, the operation of impressing the latter at least on the fixed locking member does not have to be followed by a heat treatment. Since the hinge members are usually produced by stamping operations, there are no difficulties in also providing one of the hinge members with a collar in the same operation. It is a further advantage of designing one of the locking members in accordance with the invention that the serrations may without additional costs be made finer than those on the previous locking members. Due to these fine serrations on the locking members it is now no longer necessary to provide an intermediate gear between the axially movable locking member and the associated hinge member and it is now possible to modify the hinge fitting by mounting the locking members coaxially to the hinge axis. The serrations are generally provided in the form of straight-fluted teeth since the production of other types of teeth is more difficult if the teeth are as usually provided on the peripheral surface of the collar rather than on its end surface.

The collar and therefore also the inner surface of the axially movable locking member are preferably made of a conical shape, although it is also possible to make them of a cylindrical shape.

In the event that the sheet material of which the hinge member is made is not sufficiently thick to permit the serrations to be impressed into a collar thereon, the collar may be made of a greater thickness than the adjacent parts of the hinge member. If this collar is integral with the hinge member, this may be accomplished by upsetting the collar or by reinforcing it by an outer or inner ring which is firmly secured to the collar. If the ring consists of sintered metal and is secured to the inside of the flange, it will also have excellent bearing properties for the rotation of a shaft which is mounted within the ring. The deformability of sintered metals facilities the operation of impressing the serrations not only into an outer ring but also into an inner ring, if the serrations on the collar also extend into the inner ring.

Instead of producing the collar as an integral part of the hinge member, it is, of course, also possible to provide it in the form of a ring which may be secured to the hinge member, for example, by welding. If desired, this ring may be provided with a flange for increasing the size of its contact surface with the hinge member.

The principal feature of the present invention of replacing a gear wheel or the like which is rigidly secured to another part by means of a collar on the component itself is not limited to hinge fittings but may also be applied to other types of devices or machines.

The above-mentioned as well as additional features and advantages of the present invention will become more clearly apparent from the following detailed description thereof which is to be read with reference to the accompanying drawings, in which:

FIGS. 3 to 10 show cross sections of different modifications of the collar on one hinge member which is provided with serrations or gear teeth; and FIG. 11 is a cross-section of a collar disclosing the arrangement of a friction layer on the collar.

Figure 1:
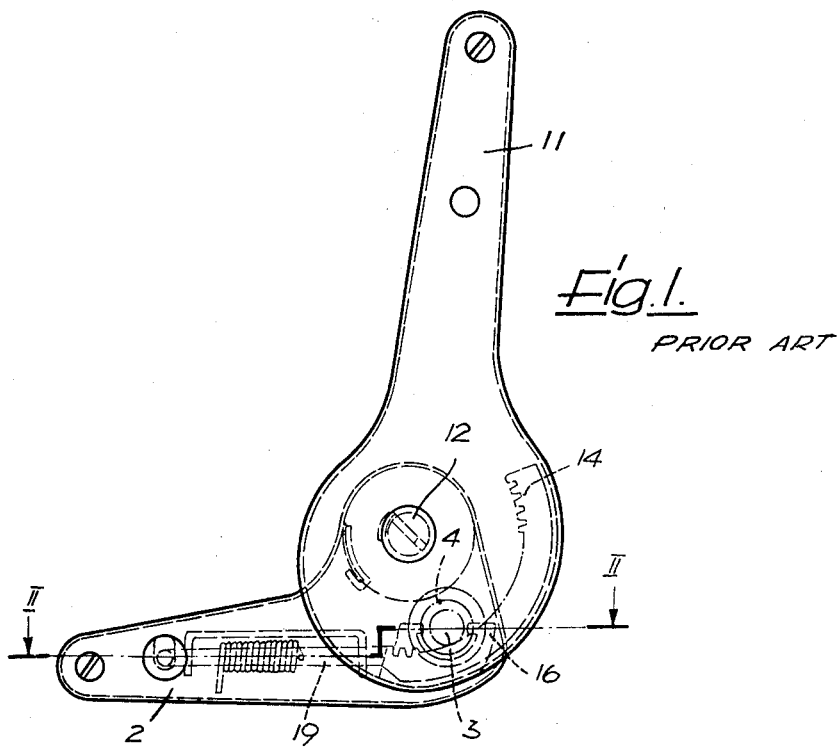
FIG. 1 shows a side view of a hinge fitting according to the invention.
Figure 2:
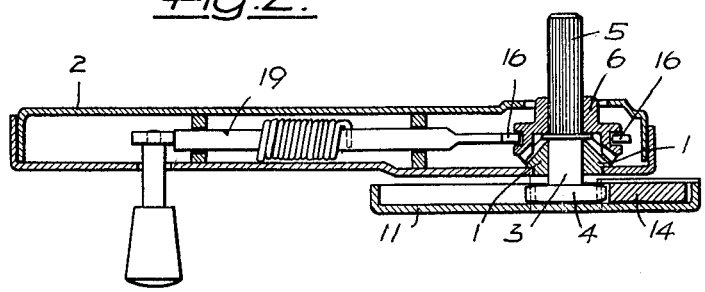
FIG. 2 shows a cross section which is taken along the line II—II of FIG. 1.

The hinge fitting according to the invention as illustrated in FIGS. 1 and 2 comprises a first hinge member 11 which is adapted to be secured to one side of a back rest and a second hinge member 2 which forms a casing and is adapted to be secured to the same side of a seat and is pivotably connected to the first hinge member 11 by means of a pivot 12. The first hinge member 11 has a segmental rack 14 rigidly secured thereto which extends coaxially to the pivot 12 and meshes with a pinion 4. This pinion 4 is rigidly secured to one end of a shaft 3 which is mounted centrally within a first locking member 1 which is rigidly secured to or integral with the hinge member 2. The other end of shaft 3 carries a second locking member 6 which is connected to the shaft 3 by means of corresponding serrations or splines 5 on shaft 3 and in the wall of the bore of the hub of the second locking member 6 so as to be nonrotatable relative to shaft 3 but slidable in its axial direction. For shifting the second locking member 6 in this manner, hinge member 2 contains a rod 19 which may be turned about its axis by a handle on one end, while its other end is bifurcated so as to form a pair of fingers 16 which engage into an annular groove in the locking member 6. Both locking members 1 and 6 are provided with serrations or gear teeth which may be engaged with or disengaged from each other depending upon the position of the locking member 6 so as either to prevent the two locking members 1 and 6 from turning relative to each other or to enable them to be so turned.

FIGS. 3 to 10 illustrate several preferred embodiments of the locking member 1 which is rigidly secured to the hinge member 2. According to FIG. 3, this locking member 1 may consist of a frusto-conical collar 21 which is integral with the hinge member 2 and provided with a set of bevel teeth 21' on its outer surface. This collar 21 and its teeth 21' may be produced either by cold-pressing or hot-pressing of the material of hinge member 2.

The locking member 1 according to FIG. 4 consists of a cylindrical collar 22 with a cylindrical set of teeth 22' thereon. This cylindrical collar 22 may also serve as a bearing for the cylindrical shaft 3.

The locking member 1 according to FIG. 5 is similar to that as shown in FIG. 3 insofar as it consists of a frusto-conical collar 23 with a set of bevel teeth 23' thereon, but it is provided with an end wall and a bore 23'' therein.

If the sheet material of which the hinge member 2 is made is too thin to permit a collar with gear teeth to be formed, the thickness of this collar 24 may be increased, for example, by upsetting, as illustrated in FIG. 6.

Another embodiment of the locking member as shown in FIG. 7 consists of a frusto-conical ring 25 which is firmly secured to the hinge member 2, for example, by welding. The teeth 25' are pressed into the outer conical surface of this ring 25.

The wall thickness of the collar may also be increased in the manner as illustrated in FIG. 8 by fitting a ring 26 over the collar 27 and firmly securing it either to this collar or to the hinge member 2 itself or to both. The teeth 26' may again be impressed into the outer surface of ring 26.

According to FIG. 9, ring 28 is provided with a flange 28'' which may be easily secured to the hinge member 2, for example, by spot-welding. Otherwise this embodiment does not differ from that according to FIG. 7.

FIGS. 10a and 10b illustrate a further embodiment of the locking member in which the cylindrical collar 29 is reinforced by inserting into the bore of the collar 29 a cylindrical ring 30, as shown in FIG. 10a, the outer surface of which facing collar 29 is provided with one or more annular grooves 30'. When the bevel teeth 29' are thereafter impressed into the material of collar 29, this material will be forced into these annular grooves 30', as shown in FIG. 10b, so that ring 30 can no longer be shifted in the axial direction within collar 29. When comparing FIGS. 10a and 10b which show the collar 29 with the inner ring 30 before and after the teeth are impressed, it will be seen that the upper end of the collar will be made of a conical shape by this impressing operation and the wall thickness of collar 29 will be slightly increased. If desired, the teeth may also be stamped into the collar 29 to such a depth that the teeth 29' will partly be formed by the collar 29 and partly by ring 30.

Instead of providing the locking collar on hinge member 2 and the axially movable locking member 6 with corresponding serrations or gear teeth, it is also possible to provide these two locking members with friction layers.

Although our invention has been illustrated and described with reference to the preferred embodiments thereof, we wish to have it understood that it is in no way limited to the details of such embodiments but is capable of numerous modifications within the scope of the appended claims.

1. In a hinge fitting for a seat with an adjustable back rest, especially for a motor vehicle, having a first hinge member adapted to be secured to the back rest, a second hinge member adapted to be secured to the seat and pivotably connected to said first hinge member, a first locking member rigid on said second hinge member and having an outer surface, a shaft rotatably mounted in said first locking member, a tubular second locking member mounted on said shaft so as to be nonrotatable thereon but movable in the axial direction thereof, said second locking member having an inner surface adapted to engage with or to disengage from said outer surface of said first locking member when said second locking member is shifted in one direction or the other, means provided on the outer surface of said first locking member and on the inner surface of said second locking member for preventing one locking member from rotating relative to the other locking member when said two locking members are engaged with each other, means for securing said shaft against movement in its axial direction, and means for shifting said second locking member in its axial direction from one position in engagement with said second locking member to another position in which it is disengaged from said second locking member, and vice versa, the improvement consisting of the fact that said first locking member comprises a collar integral with said second hinge member.

2. A hinge fitting as defined in claim 1, in which said means for preventing said first locking member from rotating relative to said second locking member consist of teeth on said collar and on said first locking member.

3. A hinge fitting as defined in claim 1, in which said means for preventing said first locking member from rotating relative to said second locking member consist of friction layers mounted on said surfaces of said locking members.

4. A hinge fitting as defined in claim 1, in which the outer surface of said first locking member and the inner surface of said second locking member have a conical shape.

5. A hinge fitting as defined in claim 1, in which said collar has a thickness greater than the adjacent parts of said second hinge members.

References Cited

UNITED STATES PATENTS

| | | | |
|---|---|---|---|
| 2,401,256 | 5/1946 | Lear | 188—71 |
| 2,861,291 | 11/1958 | Milton | 188—71 |
| 3,156,004 | 11/1964 | Strien et al. | 297—367 |

BOBBY R. GAY, Primary Examiner

D. L. TROUTMAN, Assistant Examiner